United States Patent [19]

Newnan

[11] Patent Number: 5,244,159
[45] Date of Patent: Sep. 14, 1993

[54] GRINDING BURRS FOR COFFEE BEAN GRINDERS

[75] Inventor: Brian D. Newnan, Louisville, Ky.

[73] Assignee: Grindmaster Corporation, Louisville, Ky.

[21] Appl. No.: 10,999

[22] Filed: Jan. 29, 1993

[51] Int. Cl.$^5$ .............................................. B02C 7/12
[52] U.S. Cl. ................................. 241/261.3; 241/296; 241/297
[58] Field of Search ............ 241/100, 296, 297, 261.2, 241/261.3

[56] References Cited

U.S. PATENT DOCUMENTS

| | | |
|---|---|---|
| Re. 5,943 | 6/1874 | Belknap. |
| 28,136 | 5/1860 | Brock. |
| 80,171 | 7/1868 | Hartsock .......................... 241/296 |
| 772,642 | 10/1904 | Carr. |
| 901,647 | 10/1908 | Richards. |
| 992,000 | 5/1911 | Kihlgren. |
| 1,485,855 | 3/1924 | Kidney. |
| 1,523,070 | 1/1925 | Hush. |
| 2,968,444 | 1/1961 | Jones. |
| 2,988,290 | 6/1961 | Merges ............................ 241/296 |
| 3,028,634 | 4/1962 | Coghill ............................ 241/261.2 |
| 3,586,250 | 6/1971 | Shouvlin .......................... 241/252 |
| 4,039,153 | 8/1977 | Hoffman .......................... 241/248 |
| 4,428,538 | 1/1984 | Valdivia .......................... 241/298 |
| 4,605,175 | 8/1986 | Weber ............................. 241/56 |
| 4,967,649 | 11/1990 | Ephraim et al. ..................... 99/286 |
| 5,058,814 | 10/1991 | Ephraim et al. ................. 241/261.2 |

FOREIGN PATENT DOCUMENTS 326110  9/1920  Fed. Rep. of Germany ... 241/261.3

*Primary Examiner*—Mark Rosenbaum
*Assistant Examiner*—John M. Husar
*Attorney, Agent, or Firm*—Vance A. Smith

[57] ABSTRACT

Grinding burrs for use in a coffee bean grinder comprises a stationary disk and a rotary disk. Each of the disks has a multiplicity of teeth arranged in stages about the center of the disk. One of the disks has its multiplicity of teeth adapted to nest among and be spaced predetermined distances from the multiplicity of teeth of the other disk. Each disk includes a first stage of teeth comprising at least four teeth equally spaced apart in a circular row about the center of the disk a distance at least greater than the average diameter of coffee beans to be ground. The burr disks also include a second stage of teeth aligned in at least one circular row and spaced outwardly from the first stage of teeth and a third stage of teeth aligned in at least one circular row about the center and spaced outwardly from the second stage. Each tooth of the various stages has a triangularly shaped leading surface forming a first apex, a triangularly shaped trailing surface forming a second apex, and a pair of lateral surfaces converging to form a line of intersection between the apices. The leading surface of each tooth has a slope angle of between about 15° and 30° to the vertical of said disk while the trailing surface is at a slope angle of between about 40° to 60° to the vertical of the disk.

13 Claims, 3 Drawing Sheets

GRINDING BURRS FOR COFFEE BEAN GRINDERS

BACKGROUND OF THE INVENTION

This invention relates to disks used to grind material into particulate of predetermined size and, more particularly, to grind coffee beans into ground coffee of a predetermined size.

Grinding disks or burrs have been in use for centuries to process food stuffs such as grain into flour and the like. Typically, one burr is held stationary with respect to the other, the rotating burr. The material to be ground is metered between the opposing surfaces thereof usual through openings or apertures in the center of the burrs. The material is then moved across the surfaces of the burrs under pressure and diminished into fines. To promote the grinding action, the burrs may be made abrasive through the use of tough, abrasive material coating the face of the burr or, as is more typical today, the use of pins or teeth integral with the burr disks. In coffee bean grinders, the teeth of the two disks "nest" together and cause the material to be broken and the ground into the final size. ("Nest", "nested", or "nesting" for purposes of this description means the teeth on one disk have a juxtaposed but slightly spaced relationship to the teeth on the other disk.) An early example of a nested pair of grinding disks or burrs is illustrated in U.S. Pat. No. 492,000 issued May 9, 1911 to Kiregreen. The nesting of the teeth permitted the beans to be ground therebetween.

Apparatus using grinding burrs having teeth or serrated surfaces for grinding material are legion. U.S. Pat. Nos. 4,967,649 and 5,052,814 both issued to Ephraim et al on Nov. 6, 1990 and Oct. 22, 1991, respectively, provide discussions on how the coffee beans are metered into the grinding burrs. The techniques of metering beans into the grinder does not form a part of the present invention and a discussion is not deemed necessary for an understanding of the present invention. To the extent such a discussion is considered important, then the substance of such patents are incorporated by way of reference herein for such understanding.

To more clearly discuss such burrs and the various dimensions making the burr, reference is made to FIGS. 1–3. FIG. 1 represents in schematic form a typical grinding burr tooth 10. The leading face 12 of tooth 10 is shown in the direction of rotation 14 of disk 16. The trailing face 18, as its name implies, trails the leading face 12 during rotation. Each face 12 and 18 has a triangular shape sloping inwardly, thus forming a slope angle with the vertical. Connecting the faces 12 and 18 are a pair of lateral faces 20 and 22 converging toward each other in an upward direction from disk 16. The line of intersection 24 of faces 20 and 22 extends between the apices of faces 12 and 18.

FIG. 2 depicts a portion of disk 16 having a grouping of teeth 10 positioned in circular rows having center of curvatures coinciding with the center of disk 16. Adjacent rows of teeth 10 form "tangential valleys" 26 that circle the center of disk 16. As seen in FIG. 2, adjacent teeth 10 form V-shaped valleys 28 called radial valleys. The line of intersection of each leading face 12 with the surface of disk 16 lies along the bottom of each radial valley 28. The pattern of teeth of a typical coffee bean grinding burr disk is formed so that the line of intersection in an inner row is coextensive with a line of intersection in the next row. Dashed line 30 represents this coextensive structure. Thus, assuming there is no obstruction, a particulate of the material being ground would "see" a clear path or exit from the first row of teeth to the perimeter of the disk through a connected series of radial valleys. Despite the descriptive adjective "radial", radial valleys are generally not coextensive with radial lines or rays drawn from the center of the burr disk. For reasons to be described below, it is desirable that the connected radial valleys (and therefore extension line 30) be at an angle or skewed with respect to a ray of the disk intersecting the extension line at start of the line of intersection of the leading face of a tooth in the first or innermost row. The skewing of the radial valleys 28 to a ray 32 is illustrated in FIG. 3. Circle 34 represents the innermost row of teeth 10. Dashed line 36 represents a connected group of radial valleys 28 and forms an angle 38, the skew angle, with ray 32. The skew angle may be more specifically defined as the angle between the coextensive line formed by the intersections of the leading faces with a ray since, as will be discussed below, some of the teeth in the innermost rows are spaced from each other and thus do not form the V-shaped valleys.

The teeth of a grinding burr are generally grouped and characterized by results desired from the teeth. For example, the teeth of the inner most row of teeth are the largest teeth on the burr disk and are called cracking teeth. Cracking teeth are spaced far enough apart to allow the coffee beans to move therebetween. Thus, the distance between teeth in the first row must exceed the average diameter of the coffee beans to be ground. This distance is preferably about 3 centimeters or greater. The coffee beans metered between the two disks are first cracked by the nested cracking teeth, with the resulting particles being extruded between the inside lateral face of the stationary teeth and the outside lateral face of the rotary teeth. The particles are scrapped off by the cutting edge of the next adjacent tooth, the cutting edge being defined as the edge between the leading face and the inside lateral face. The extruding action continues until the particles reach an exit, a radial valley that it is not blocked by a nested tooth. Then by a combination of forces, centrifugal and feed forces, the particles proceed outwardly from the center of the disk through the open radial valley into the next tangential valley. The extruding action continues until the particles reach the next exit. As the particles move steadily outward toward the perimeter of the disk, the size of the teeth become smaller as does the average gap between the nested teeth. The outermost teeth are frequently referred to as sizing teeth while the those in the middle are often called intermediate teeth.

A careful examination of the burrs currently used in the grinding of coffee has resulted in a determination by applicant that the gaps or clearances between nested teeth are uneven. The inside lateral face of a tooth is often spaced a different distance from its associated nested tooth than the outside lateral face. Applicant then noted that the uneven clearances or gaps frequently caused flow pinch points that resulted in diminished through put during the grinding process and also resulted in increased power consumption.

Upon further analysis of current prior art coffee bean grinding burrs, it was noted that the "slope angle" of the leading face of the teeth of the burrs were about 45° while the trailing faces had slope angles of between 30° and 45°. Slope angle is defined as the angle between the sloping face and a line vertical to the surface of the disk. Applicant has determined that the proper selection of the slope angles of both the leading and trailing faces is an important factor in the improved performance of the grinding burrs.

Still another factor determined by applicant to be important, yet apparently not considered by those skilled workers in the prior art, is the construction of burrs with the proper skew angles. Applicant has noted that the "combined skew angles" of the current prior art grinding burrs of coffee bean grinders do not exceed about 92°. For purposes of this description, combined skew angle is defined as the sum of the skew angle of the rotary burr disk and the stationary burr disk. Applicant has found that, by the careful selecting the combined skew angle, the performance of the coffee bean grinders using the grinding burrs can be further improved.

Finally, applicant determined that the prior art coffee bean grinding burr designs generally ignore the relative depth of the radial valleys and tangential valleys, particularly with respect to the final sizing teeth. For example, when burrs are adjusted to provide coffee fines such as used with espresso where the mean particle size is about 0.010 inches, it has been observed that the radial valleys of prior art burrs are often higher than the tangential valleys, resulting in a jamming of the coffee paths. This causes an undesired heating of the fines and larger power consumption.

These findings as the result of applicant's analysis of prior art coffee bean grinders has led applicant to address the objectives set forth below.

It is a paramount object of the present invention to provide for an improved coffee bean grinding burr having superior grinding rates.

It is another object of the present invention to provide for coffee bean grinding burrs that minimize flow pinch point.

It is still another object of the present invention to provide for improved coffee bean grinding burrs minimizing jamming of coffee bean fines.

These and other objectives will become apparent to those skilled in the art after a reading the following description and appended drawing.

SUMMARY OF THE INVENTION

In accordance with the present invention, the improved grinding burrs for use in a coffee bean grinder comprises a stationary disk and a rotary disk. Each of the disks has a multiplicity of teeth arranged in stages about the center of the disk. One of the disks has its multiplicity of teeth adapted to nest among and be spaced predetermined distances from the multiplicity of teeth of the other disk. Each disk includes a first stage of teeth comprising at least four teeth equally spaced apart in a circular row about the center of the disk a distance at least greater than the average diameter of coffee beans to be ground. The burr disks also include a second stage of teeth aligned in at least one circular row and spaced outwardly from the first stage of teeth and a third stage of teeth aligned in at least one circular row about the center and spaced outwardly from the second stage. Each tooth of the various stages has a triangularly shaped leading surface forming a first apex, a triangularly shaped trailing surface forming a second apex, and a pair of lateral surfaces converging to form a line of intersection between the apices. The leading surface of each tooth has a slope angle of between about 15° and 30° to the vertical of said disk while the trailing surface is at a slope angle of between about 40° to 60° to the vertical of the disk.

DETAILED DESCRIPTION OF THE DRAWING

DETAILED DESCRIPTION OF THE PREFERRED EMBODIMENT OF THE PRESENT INVENTION

In designing the improved burr plates of the present invention, applicant made numerous measurements of grinding burrs currently being used and also determined their representative grinding rates. For example, the grinding rate of a model 100 coffee bean grinder available from the Grindmaster Corporation using burr set part nos. 410 and 411 was found to be about 0.48 oz/sec using current grinding burrs employed in coffee bean grinders. When the burrs were replaced with burrs constructed in accordance with the present invention, grinding rates of about 0.61 oz/sec were observed with same power consumption and without any observable deleterious effect to the quality of the ground coffee. The percentage improvement was about 27%.

Applicant's improvements to coffee bean grinding burrs involve (a) balanced separation of the nested teeth, (b) ensuring that radial valleys have a depth equal to or greater than the tangential valley from which it exits, (c) decreasing the slope angle of the leading face, i.e., making the leading face more vertical, (d) increasing the slope angle of the trailing face, i.e., making the face less vertical and the lateral faces longer toward the trailing face, and (e) increasing the combined skew angle.

Figure 1:
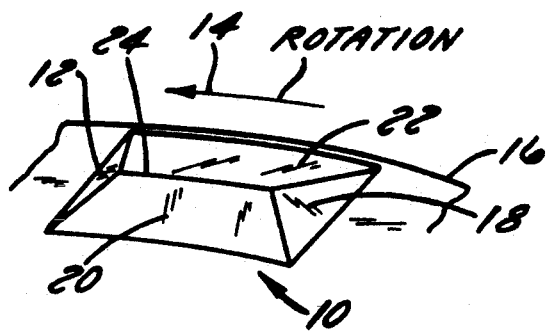
FIG. 1 is a schematic representation in perspective of a portion of a grinding burr disk including a typical grinding tooth in accordance with the prior art.
Figure 2:
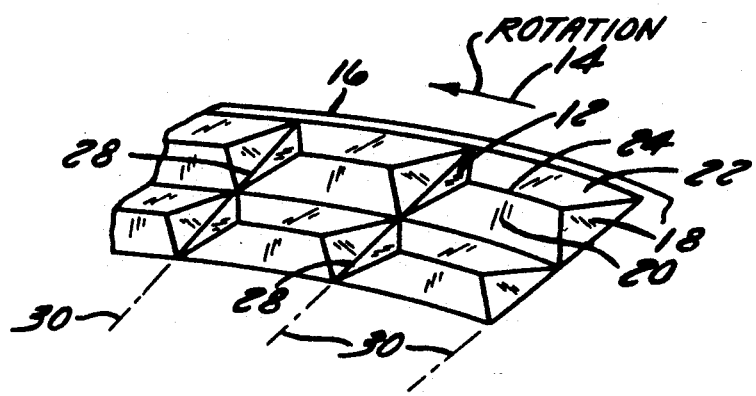
FIG. 2 is a schematic representation in perspective of a portion of a grinding burr disk including a typical grouping of teeth in accordance with the prior art.
Figure 3:
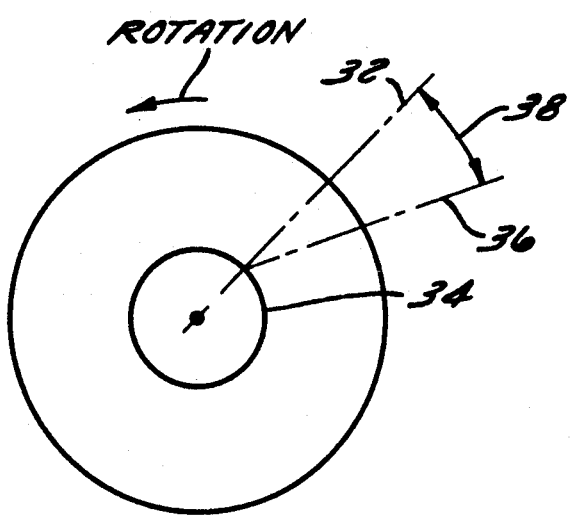
FIG. 3 is a schematic representation of a grinding burr disk used to demonstrate the skew angle of a grinding burr disk in accordance with the prior art.
Figure 4:
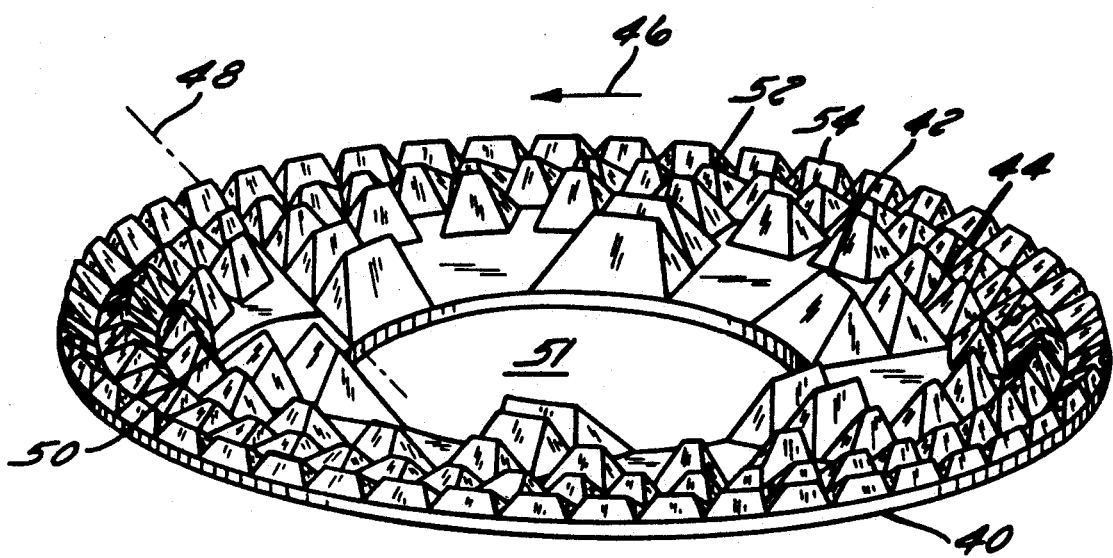
FIG. 4 is perspective of a rotary grinding burr in accordance with the present invention.

Referring to FIG. 4, it may be seen that disk 40 is provided with two rows of cracker teeth, primary cracker teeth 42 and secondary cracker teeth 44. It is desirable that each row of the cracker teeth have at least four, preferably six, teeth spaced equally apart. The direction of rotation is shown by arrow 46. As shown by line 48, the lines of intersection of leading faces 50 are coextensive forming a path from the first cracker tooth to the perimeter. Intermediate teeth 52 are about 46% the size of cracker teeth 42 with the final sizing teeth 54 being about 123% the size of the intermediate teeth 52. The drawings are not meant to be to scale. Opening 51 represents the aperture into the grinding burrs.

Disk 40 may be about 3.7 inches in diameter with the cracker teeth having a height of about 0.29 inches and a base length measured along the bottom edge of the lateral surfaces from the leading edge to the trailing edge of about 0.44 inches. The length of the top of the tooth may be about 0.29 inches. The dimensions of the disk and teeth may be changed as desired depending upon the nature of the material to be ground, the diameter o the burr disks, and the characteristics of the grinding apparatus itself. Such disks are made by conventional and well known fabrication techniques such as casting and lapping.

Figure 5A:
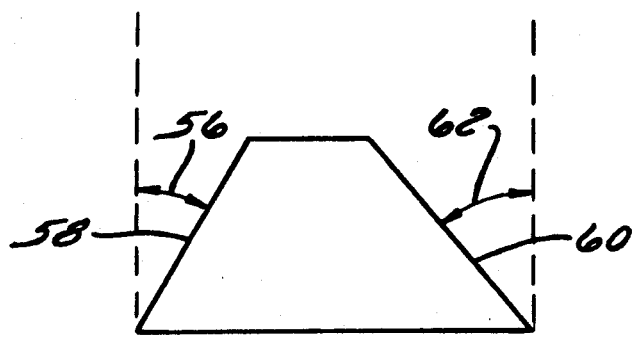
FIG. 5A is a side view of a tooth of the burr of FIG. 4 to demonstrate the slope angles of the leading and trailing faces.

The selected slope angles for the teeth are illustrated in FIG. 5A. The slope angle 56 of the leading face 58 has been selected and is set forth in FIG. 5A as 30° although applicant has determined that a range of between about 15° and 30° is acceptable and provides for improved results. It has been noted that a more vertically abrupt leading face provides more energy to the coffee beans and the particulate material and thus is more efficient in cracking the beans and reducing the particulate size. Making the leading face too steep, however, sacrifices the "funneling" effect of the leading face. That is, a function of the leading face is to guide or funnel the particulate into the tangential valleys. As the face becomes progressively steeper, the funneling effect is diminished. In order to preserve the best aspects of both the breaking and funneling functions, applicant has determined that the slope angle of the leading edge should be between about 15° to 30°. Slope angles of less than about 15° virtually eliminates the desired funneling effect while slope angles above about 30° reduce the efficiency of breaking the particles below acceptable levels.

Conversely, the slope angle 62 of the trailing face 60 has been relaxed and the trailing edge of the lateral surface made longer. A trailing face slope angle of between about 40° to 60°, with an angle of 45° being preferred, provides improved results also. By having a more gradual sloping of the trailing face, the coffee particulate more easily moves off of the lateral faces as more open area is involved. Slope angles of more than about 60° decreases the extruding activity occurring between the lateral faces, resulting in an undesired broader distribution of ground coffee sizes.

Figure 5B:
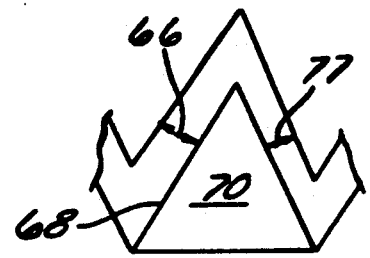
FIG. 5B is an end view of a tooth of the burr associated with a pair of nesting teeth of the other burr plate to demonstrate the balanced and diminishing gap spacing between the lateral faces of a tooth and the facing lateral faces of the nesting teeth.
Figure 6:
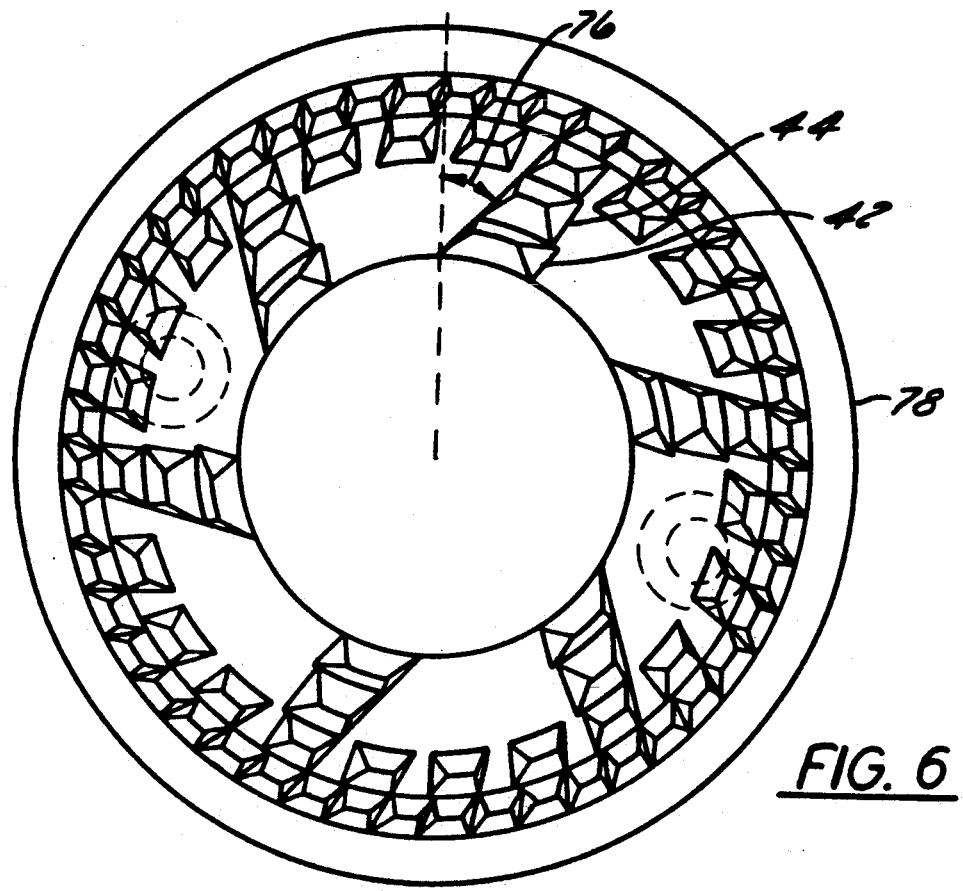
FIG. 6 is a top view of a stationary burr used in association with rotary burr of the burr of FIG. 4.
Figure 7:
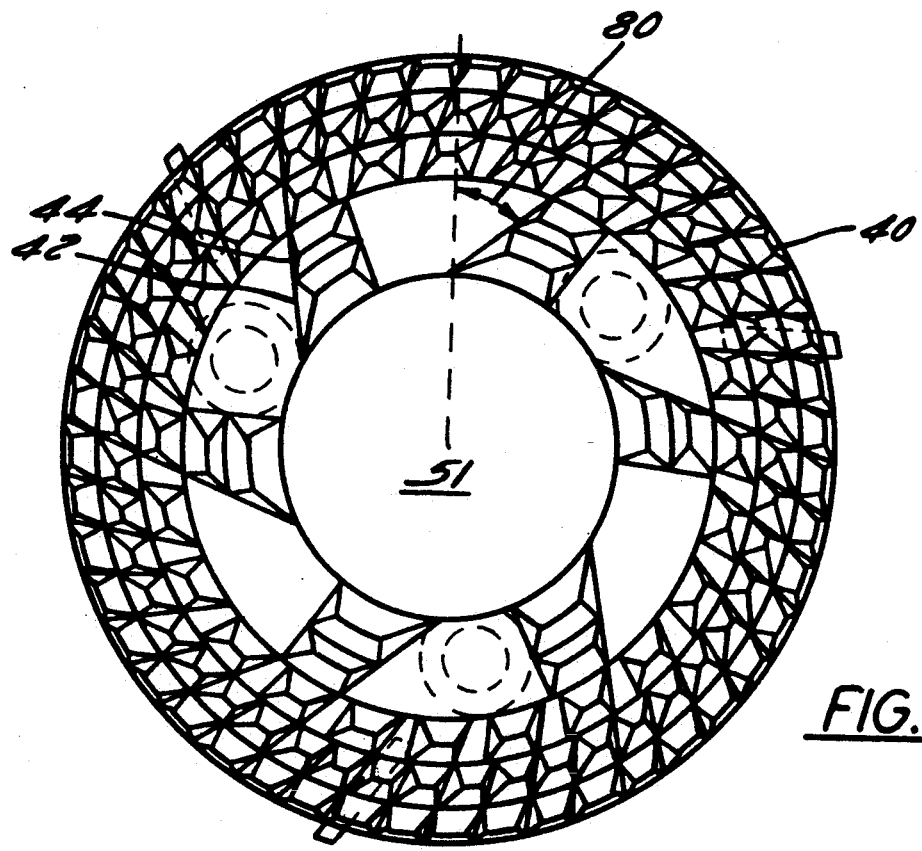
FIG. 7 is a top view of the burr in FIG. 4.

As can be seen by comparing FIG. 6 with FIG. 7, the teeth of the rotary disk are adapted to fit within the teeth of the stationary disk so as to provide a spacing or gap between the teeth of the two disks when nested. As pointed out that the prior art burrs as analyzed by applicant had unbalanced designs. Applicant has determined that it is preferable to balance the nesting of teeth to ensure that the width of the gap between the lateral faces of nested teeth progressively and consistently diminishes proceeding from the inside rows of the first cracker teeth to the periphery rows of the outside final sizing teeth. The unbalanced designs of the prior art have gaps that may become smaller but have inconsistencies in the progression. Such inconsistencies are manifested in the gaps measured from the inside lateral surface of a tooth being larger than the gap measured from the outside lateral surface. An examination of the prior art burr disks when in a nested arrangement has revealed that the inconsistent gapping results in pinch points in the flow of the particulate material, thus a reduction in the efficiency of the grinding operation. FIG. 5B illustrates the proper balancing that eliminates the inconsistencies. As can be seen the gap width 66 existing between lateral surface 68 of tooth 70 is slightly large than gap width 72. The progressively and consistently smaller gaps widths provide for more balanced size reduction and eliminates the pinch points that otherwise hinder the flow of the particulate material. For the dimensions of disks and teeth set forth above, applicant has found that dimensions of gaps of about .25 inches about the inside face lateral faces of the cracker teeth steadily diminishing to gap of about 0.01 inches the final sizing teeth are satisfactory. Gap widths, however, may vary depending upon the nature of the beans being ground and the final desired size of the coffee grounds.

The skew angles of the stationary and rotary disks are best seen respectively in FIGS. 6 and 7. The selected skew angle 76 of stationary disk is about 45° while the skew angle 80 of rotary disk 40 is about 53°. The collective skew angle is thus about 98°. Applicant has determined that by increasing the collective skew angles, the pressure on the coffee particulate to move more rapidly from the inside where it was initially metered between the burrs to the outside can be increased. Collective skew angles of prior art burr designs to grind coffee beans have been measured to be no more than about 92°. But applicant through careful analysis has determined that collective skew angles of 93° or above provide superior results. However, collective skew angles above about 100° have been found to lead to heated or over processed coffee and thus should be avoided.

As mentioned above one of the short comings of the prior art burr grinders is the lack of attention given to the relative depth of the radial valleys that exit from the 10 tangential valleys with respect to the depth of such tangential valley. Applicant has observed that radial valleys as deep or preferably deeper, i.e., 0.010 inches, than the connected tangential valley minimizes the jamming effect that can occur resulting in heated or over processed coffee, particularly where fines are being produced for espresso coffee and the like.

In this disclosure, there is shown and described only the preferred embodiment of the invention, but it is understood that the invention is capable of changes and modifications within the scope of the inventive concept as expressed herein.

I claim:

1. A pair of grinding burrs for use in a coffee grinder, comprising
   a stationary disk and a rotary disk, each of said disks having a multiplicity of teeth arranged in stages about the center of said disk, one of said disks having its multiplicity of teeth adapted to nest among the multiplicity of teeth of said other disk,
   each of said disks having
      a first stage of teeth comprising at least four teeth aligned in a circular row about said center and spaced apart a distance at greater than the average diameter of coffee beans to be ground;
      a second stage of teeth aligned in at least one circular row about said center and spaced outwardly from said first stage;
      a third stage of teeth aligned in at least one circular row about said center and spaced outwardly from said second stage, each of said teeth having a triangularly shaped leading surface forming a first apex, a triangularly shaped trailing surface forming a second apex, and a pair of lateral surfaces converging to form a line of intersection between said apices, said leading surface being at a slope angle of between about 15° and 30° to the vertical of said disk and said trailing surface being at a slope angle of between about 40° to 60° to the vertical of said disk;

the leading face of a tooth in one row forming a line of intersection with the surface of its associated grinding burr that is coextensive with a line of intersection formed by the leading face of a tooth in the next outer row, said lines of intersection forming a continuous straight line from the innermost row to the outermost row located adjacent the perimeter of said disk, said outer stage of teeth forming V-shaped radial valleys defined by said leading surfaces and trailing surfaces with said continuous straight line extending along the bottom of said radial valleys;

said teeth in said adjacent rows forming tangential valleys therebetween; and said radial valleys between teeth in a row located near the periphery of said disk being at least as deep as the tangential valley formed by said peripheral row with the next inner adjacent row.

2. The grinding burrs of claim 1 in which the sum of the skew angles of both disks is between about 95° to 100°.

3. The grinding burrs of claim 2 in which the sum of the skew angles is about 98°.

4. The grinding burrs of claim 1 in which all of said teeth have a trailing slope angle of about 45°.

5. The grinding burrs of claim 1 in which the width of the gaps between each tooth measured from each lateral surface thereof to the lateral face of associated nested teeth become progressively and constantly smaller from the inner most row of teeth to the outer most row in said third stage.

6. A pair of grinding burrs for use in a coffee grinder comprising a stationary disk and a rotary disk, each of said disks having a multiplicity of teeth arranged in stages about the center of said disk, one of said disks having its multiplicity of teeth adapted to nest among the multiplicity of teeth of said other disk, each of said disks having a first stage of said teeth comprising at least four teeth aligned in a circular row about said center and spaced apart a distance at least greater than the average diameter of coffee beans to be ground, a second stage of said teeth aligned in at least one circular row about said center and spaced outwardly from said first stage; and a third stage of teeth of said aligned in at least one circular row about said center and spaced outwardly from said second stage, the width of the gaps between each tooth measured from each lateral surface thereof to the lateral face of associated nested teeth becoming progressively smaller from the innermost row of teeth in said first stage to the outermost row in said third stage.

7. The grinding burrs of claim 6 in which each of said teeth having a triangularly shaped leading surface forming a first apex, a triangularly shaped trailing surface forming a second apex, and a pair of lateral surfaces converging to form a line of intersection between said apices, said leading surface being at a slope angle of between about 15° and 30° to the vertical of said disk and said trailing surface being at a slope angle of between about 40° to 60° to the vertical of said disk.

8. The grinding burrs of claim 6 in which said leading faces of th teeth form lines of intersection with the surface of its associated grinding burr that are coextensive with lines of intersection formed by the leading faces of the next outer row, said lines of intersection forming continuous straight lines from the innermost row of said first stage to the outermost row of said third stage, said outer stages of teeth having rows forming V-shaped radial valleys defined by said leading surfaces and trailing surfaces of teeth in each of said outer stage rows with said continuous straight lines extending along the bottoms of said radial valleys, said teeth in said adjacent rows form tangential valleys therebetween, and said radial valleys between teeth in a row located near th periphery of said disk being at least as deep as the tangential valley formed by said peripheral row with the next inner adjacent row.

9. A pair of grinding burrs for use in a coffee grinder comprising a stationary disk and a rotary disk, each of said disks having a multiplicity of teeth arranged in stages about the center of said disk, one of said disks having its multiplicity of teeth adapted to nest among the multiplicity of teeth of said other disk, each of said disks having a first stage of teeth comprising at least four teeth aligned in a circular row about said center and spaced apart a distance at least greater than the average diameter of coffee beans to be ground, a second stage of teeth aligned in at least one circular row about said center and spaced outwardly from said first stage, a third stage of teeth aligned in at least one circular row about said center and spaced outwardly from said second stage, each of said teeth having a triangularly shaped leading surface forming a first apex, a triangularly shaped trailing surface forming a second apex, and a pair of lateral surfaces converging to form a line of intersection between said apices, said leading faces of the teeth forming lines of intersection with the surface of its associated grinding burr that are coextensive with lines of intersection formed by the leading faces of the next outer row, said lines of intersection forming a continuous straight lines from the innermost row located in said first stage to the outermost row in said third stage, said outer stages of teeth forming V-shaped radial valleys defined by said leading surfaces and trailing surfaces with said continuous straight lines extending along the bottoms of said radial valleys, the sum of the skew angles of said one disk and said other disk being between about 95° to 100°.

10. The grinding burrs of claim 9 in which said teeth in said adjacent rows form tangential valleys therebetween, and said radial valleys between teeth in a row located near the periphery of said disk being at least as deep as the tangential valley formed by said peripheral row with the next inner adjacent row.

11. A pair of grinding burrs for use in a coffee grinder comprising a stationary disk and a rotary disk, each of said disks having a multiplicity of teeth arranged in stages about the center of said disk, one of said disks having its multiplicity of teeth adapted to nest among the multiplicity of teeth of said other disk, each of said disks having
- a first stage of teeth comprising at least four teeth aligned in a circular row about said center and spaced apart a distance at least greater than the average diameter of coffee beans to be ground,
- a second stage of teeth aligned in at least one circular row about said center and spaced outwardly from said first stage,
- a third stage of teeth aligned in at least one circular row about said center and spaced outwardly from said second stage,
- each of said teeth having a triangularly shaped leading surface forming a first apex, a triangularly shaped trailing surface forming a second apex, and a pair of lateral surfaces converging to form a line of intersection between said apices,
- said leading faces of teeth in each row forming lines of intersection with the surface of its associated grinding burr that are coextensive with lines of intersection formed by the leading faces of the next outer row, said lines of intersection forming a continuous straight lines from the innermost row to the outermost row, said outer stages of teeth forming V-shaped radial valleys defined by said leading surfaces and trailing surfaces with said continuous straight lines extending along the bottoms of said radial valleys,
- said teeth in said adjacent rows forming tangential valleys therebetween, and
- said radial valleys between teeth in a row located near the periphery of said disk being at least as deep as the tangential valley formed by said peripheral row with the next inner adjacent row.

12. The grinding burrs of claim 11 in which said leading surface has a slope angle of between about 15° and 30° to the vertical of said disk and said trailing surface has a slope angle of between about 40° to 60° to the vertical of said disk.

13. A pair of grinding burrs for use in a coffee grinder comprising
- a stationary disk and a rotary disk, each of said disks having a multiplicity of teeth arranged in stages about the center of said disk, one of said disks having its multiplicity of teeth adapted to nest among the multiplicity of teeth of said other disk, each of said disks having
- a first stage of teeth comprising at least four teeth aligned in a circular row about said center and spaced apart a distance at least greater than the average diameter of coffee beans to be ground;
- a second stage of teeth aligned in at least one circular row about said center and spaced outwardly from said first stage; and
- a third stage of teeth aligned in at least one circular row about said center and spaced outwardly from said second stage, each of said teeth having a triangularly shaped leading surface forming a first apex, a triangularly shaped trailing surface forming a second apex, and a pair of lateral surfaces converging to form a line of intersection between said apices, said leading surface being at a slope angle of between about 15° and 30° to the vertical of said disk and said trailing surface being at a slope angle of between about 40° to 60° to the vertical of said disk wherein the width of the gaps between each tooth measured from each lateral surface thereof to the lateral face of associated nested teeth become progressively and constantly smaller from the inner most row of teeth to the outer most row in said third stage.

* * * * *